(12) United States Patent
Minami et al.

(10) Patent No.: US 6,544,610 B1
(45) Date of Patent: Apr. 8, 2003

(54) CONTAINER AND BLOW-MOLDED PRODUCT

(75) Inventors: Koji Minami, Kawasaki (JP); Tadashi Takishima, Tokyo (JP)

(73) Assignee: Zeon Corporation, Tokyo (JP)

(*) Notice: Subject to any disclaimer, the term of this patent is extended or adjusted under 35 U.S.C. 154(b) by 0 days.

(21) Appl. No.: 09/720,686
(22) PCT Filed: Jun. 29, 1999
(86) PCT No.: PCT/JP99/03485
§ 371 (c)(1),
(2), (4) Date: Mar. 15, 2001
(87) PCT Pub. No.: WO00/00399
PCT Pub. Date: Jan. 6, 2000

(30) Foreign Application Priority Data

Jun. 30, 1998 (JP) ............................................. 10-184814

(51) Int. Cl.⁷ ................................................. B32B 1/08
(52) U.S. Cl. .................................................... 428/35.7
(58) Field of Search .............................. 428/35.7, 36.6, 428/36.7; 526/280

(56) References Cited

U.S. PATENT DOCUMENTS 6,165,573 A * 12/2000 Hirose et al. .............. 428/36.6

* cited by examiner

*Primary Examiner*—Alexander S. Thomas
*Assistant Examiner*—Jane Rhee
(74) *Attorney, Agent, or Firm*—Armstrong, Westerman & Hattori, LLP

(57) ABSTRACT

A container comprised of a laminate having (I) a layer comprising a thermoplastic cycloolefin resin and (II) a layer comprising a resin other than the thermoplastic cycloolefin resin, characterized in that said thermoplastic cycloolefin resin comprises at least 30% by weight of repeating waits (A) having an alicyclic structure, at least 108% by weight of which is repeating units (A-i) having an alicyclic structure other than a norbornane structure :The container can be of a large capacity and a light weight, and has high mechanical strength and insolubility. Therefore, the container is suitable, for example, for storage and transportation of chemicals used for production of a semiconductor.

9 Claims, 3 Drawing Sheets

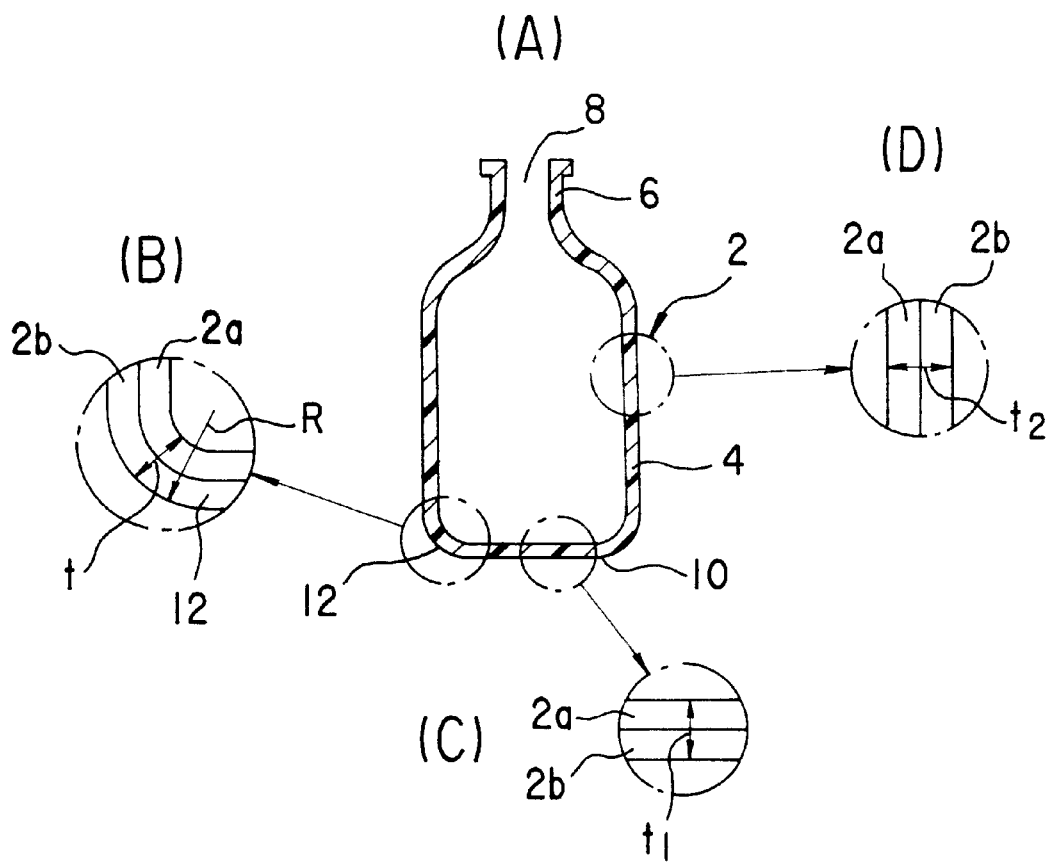
F I G. 1

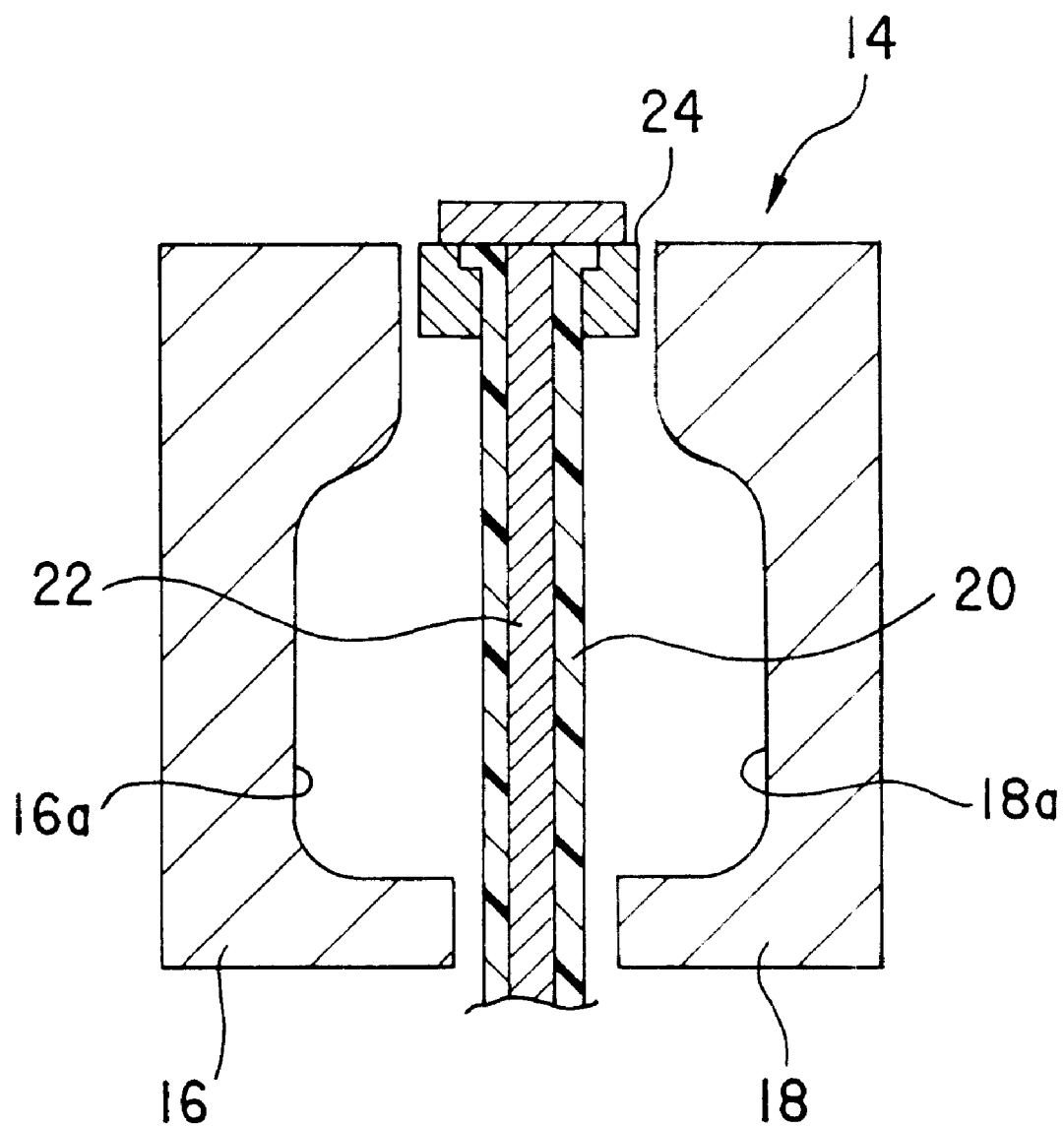
F I G. 2

CONTAINER AND BLOW-MOLDED PRODUCT

TECHNICAL FIELD

This invention relates to a container or vessel and a blow molded article. More particularly it relates to a container used as a container for which a highly reduced solubility is required, such as a container for storage and transportation of a chemical liquid used for the production of a semiconductor.

BACKGROUND ART

For a chemical liquid of a high purity such as that used for the production of a semiconductor, it is required that it is not contaminated with as impurity or other foreign matters, and a high purity must be maintained during storage and transportation. Conventional containers for storage and transportation of a chemical liquid of a high purity were made of polyethylene, polypropylene or similar material. However, low-molecular-weight organic matter and trace amounts of metal elements are sometimes dissolved from polyethylene and polypropylene into the chemical liquid to reduce the purity to undesirable extent.

Thermoplastic cycloolefin reins such as a norbornene polymer era known as having good characteristics such as reduced solubility and high chemical resistance, and therefore, have been proposed for use in vessels or containers for medicines and food.

For example, a blow molded container having a capacity of 200 ml made of a double-layer laminate comprising a ring-opened norbornene polymer layer and a polycarbonate layer is described in Japanese Unexamined Patent Publication No. H4-276253. A container having a capacity of approximately 200 ml made from a thermoplastic norbornene resin by an injection blow molding procedure is described in Japanese Unexamined Patent Publication No. H10-157719.

Vessels for a chemical liquid used for treating a semiconductor usually have a capacity of several tens of liters and are required to be lightweight for transportation. Therefore, a molding material suitable for containers with a large capacity and a thin-wall having high mechanical strength is eagerly desired.

DISCLOSURE OF THE INVENTION

In view of the foregoing, a primary object of the present invention is to provide a container and a blow molded article, which exhibit a reduced solubility and even when the wall-thickness is reduced for fabrication of large-size containers or molded articles, high strength is manifested.

Thus, in accordance with the present invention, there is provided a container comprised of a laminate having (I) a layer comprising a thermoplastic cycloolefin resin and (II) a layer comprising a resin other than the thermoplastic cycloolefin resin, characterized in that said thermoplastic cycloolefin resin comprises at least 30% by weight of repeating units (A) having an alicyclic structure, at least 10% by weight of which is repeating units (A-i) having an alicyclic structure ether than a norbornane structure.

BRIEF DESCRIPTION OF THE DRAWINGS

FIG. 1 is a view illustrating one example of the container of the invention wherein (A) is a vertical cross-sectional view of the container, (B) is an enlarged partial view of an intersecting part of the container, (C) is an enlarged partial view of the bottom plate part of the container and (D) is a enlarged partial view of the side-wall of the container.

FIG. 2 is a cross-sectional view illustrating mold for multi-layer blow molding.

BEST MODE FOR CARRYING OUT THE INVENTION

Vessel and Blow Molded Article

Figure 3:
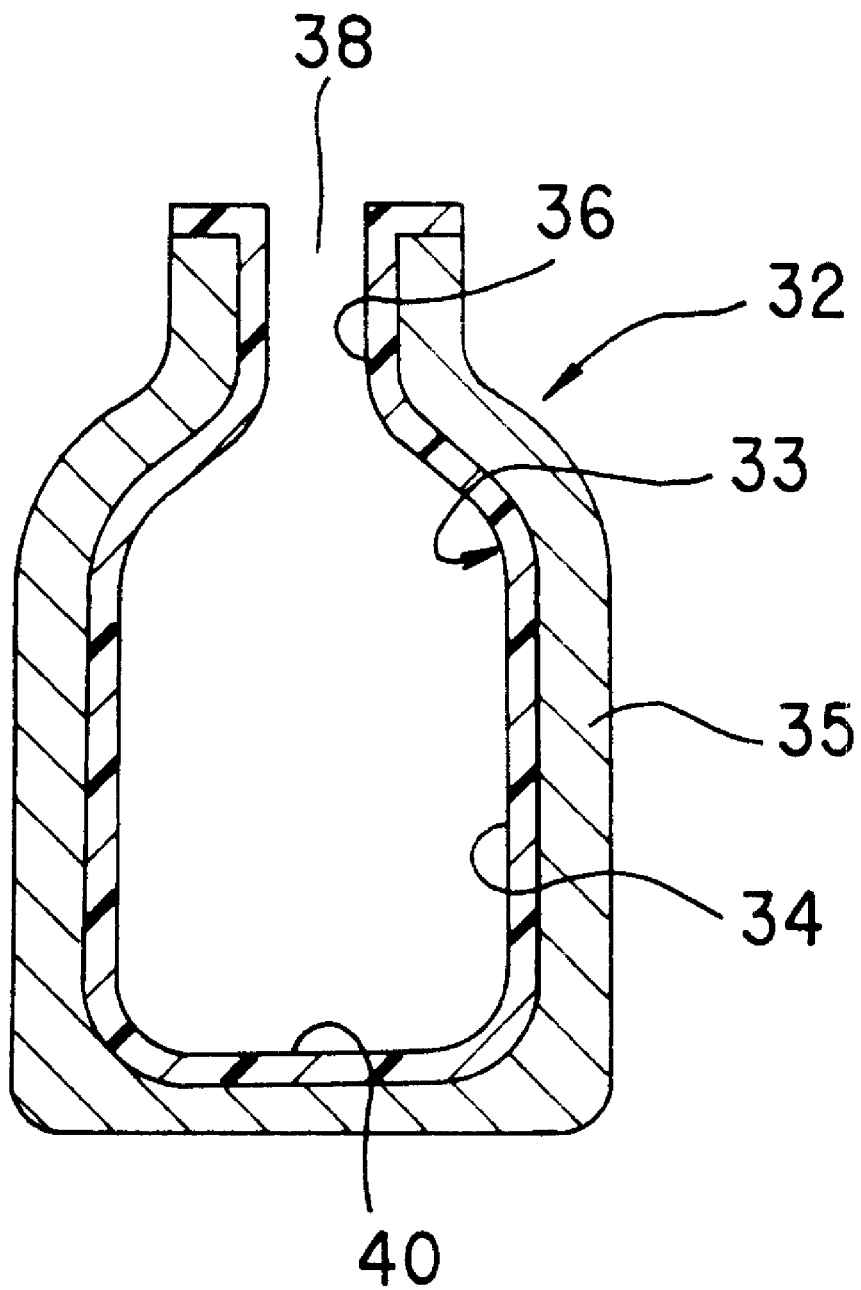
FIG. 3 is a vertical cross-sectional view illustrating another example of the container of the invention.

The container of the invention is comprised of a laminate which has at least (I) a layer comprising a thermoplastic cycloolefin resin and (II ) a layer comprising a resin other than the thermoplastic cycloolefin resin. The thermoplastic cycloolefin resin comprises at least 30% by weight of repeating units (A) having an alicyclic structure; and at least 10% by weight of the alicyclic structure repeating units (A) is repeating units (A-i) having an alicyclic structure other than a norbornane structure.

Layer (I) Comprising Thermoplastic Cycloolefin Resin

The thermoplastic cycloolefin resin used in the invention has an alicyclic structure, in the backbone or the side chains thereof. Preferably the thermoplastic cycloolefin resin has an alicyclic structure in the backbone in view of high mechanical strength and thermal resistance.

The alicyclic structure of the thermoplastic cycloolefin resin includes cycloalkene structures such as a norbornane ring structure, a cyclohexane structure, and a cyclopentane structures and cycloalkene structures such as a norbornene sing structure, a cyclohexane structure and a cyclopentene structure. Of these, cycloalkene structures are preferable in view of high mechanical strength and thermal stability.

The carbon number of the alicyclic structure, is not particularly limited, but, in view of highly balanced mechanical strength, thermal resistance sad moldability, it is usually in the range of 4 to 30% preferably 5 to 20 and more preferably 5 to 15.

The proportion of the repeating units (A) of the alicyclic structure, in the thermoplastic cycloolefin resin used in the invention can be appropriately chosen depending upon the particular use of the container, but, is usually is the range of 30 to 100% by weight, preferably 50 to 100% by weight and more preferably 70 to 100% by weight. If the proportion of the alicyclic structure, repeating units is too small, the resin has a poor thermal resistance. With the amount in this range, highly balanced mechanical strength and thermal resistance can be manifested, The proportion of the repeating units (A-i) of an alicyclic structures other than a norbornene structure is usually at least 10% by weight, preferably at least 30% by weight and more preferably at least 50% by weight. With this range, high mechanical strength is manifested at molding, good chemical resistance is obtained, and undesirable coloration of a molded article due to thermal deterioration and oxidative deterioration can be effectively prevented. The remainder other than the repeating units (A-i) of the alicyclic structure, free of a norbornene structure, is not particularly limited and can be appropriately chosen depending upon the particular use of the molded article.

As examples of the thermoplastic cycloolefin resin containing the alicyclic structure repeating units, there can be mentioned a norbornene polymer, a monocyclic cycloolefin polymer, a cyclic conjugated diene polymer, a vinyl alicyclic hydrocarbon polymer, and hydrogenation products of these polymers. Of these, a norbornene polymer and its hydrogenation product, end a cyclic conjugated diene polymer and its hydrogenation product are preferable. A norbornene polymer and its hydrogenation product are especially preferable.

(1) Norbornene polymer, and hydrogenation product

Norbornene polymers have in the repeating structure, units repeating unite derived from a norbornene monomer, preferably a norbornene monomer having at least three rings. The amount of the units derived from a norbornene monomer having at least three rings is not particularly limited, but is preferably in the range of 30% to 100% by weight, more preferably 50% to 100% by weight and especially preferably 70% to 100% by weight, based on the total repeating structure units by containing a specified amount of the repeating structure units of the norbornene monomer, the thermal resistance of the resin is enhanced and the heat deterioration is minimized.

As specific examples of the norbornene monomer, there can be mentioned bicyclo[2.2.1]hept-2-ene (trivial name: norbornene), 5-methyl-bicyclo[2.2.1]hept-2-ene, 5,5-dimethyi-bicyclo[2.2.1]hept-2-ene, 5-ethyl-bicyclo[2.2.1]-hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo-[2.2.1]hept-2-ene, 5-ethylidene-bicyclo[2.2.1]hept-2-ene, 5-vinyl-bicyclo[2.2.1]hept-2-ene, 5-propenyl-bicyclo-[2.2.1]hept-2-ene, 5-methoxycarbonyl-bicyclo[2,2,1]hept-2-ene, 5-cyano-bicyclo[2.2.1]hept-2-ene, 5-methyl-5-methoxycarbonyl-bicyclo[2.2.1]hept-2-ene, 5-ethoxycarbonyl-bicyclo[2.2.1]hept-2-ene, 5-methyl-5-ethoxycarbonyl-bicyclo[2.2.1]hept-2-ene, bicyclo[2.2.1]hept-5-enyl-2-methyl propionate, bicyclo[2.2.1]hept-5-enyl-2-methyl octanate, bicyclo[2.2.1]hept-2-ene-5,6-dicarboxylic anhydride, 5-hydroxymethyibicyclo[2.2.1]hept-2-ene, 5,6-di(hydroxymethyl)bicyclo[2.2.1]hept-2-ene, 5-hydroxy-1-propylbicyclo[2.2.1]hept-2-ene, 5,6-dicarboxybicyclo-[2.2.1]hept-2-ene, and bicyclo[2.2.1]hept-2-ene-5,6-dicarboxylic acid imide;

tricyclo[4.3.1$^{2,5}$.0$^{1,6}$]deca-3,7-diene (trivial name: dicyclopentadiene), tricyclo[4.3.1$^{2,5}$.0$^{1,6}$]deca-3-ene; tricyclo[4.4.1$^{2,5}$.0$^{1,6}$]undeca-3,7-diene, tricyclo[4.4.1$^{2,5}$.0$^{1,6}$]undeca-3,8-diene, and their partial hydrogenation product (or an adduct cyclopentadiene with cyclohexene) (i.e., tricyclo[4.4.1$^{2,5}$.0$^{1,6}$]undeca-3-ene); tricyclo[4.4.1$^{2,5}$.0$^{1,6}$]-3-undecene; 5-cyclopentyl-bioyclo[2.2.1]hept-Z-ene, 5-cyclohexyl-bicyclo[2.2.1]hept-2-ene, 5-cyclohexenyl-bicyclo[2.2.1]hept-2-ene and 5-phenyl-bicyclo[2,2.1]hept-2-ene;

tetracyclododecene monomers (i.e. monomers having a tetracyclododecene structure, such as tetracyclo-[4.4.1$^{2,6}$.1$^{7,10}$.0] -dodeca-3-ene (which may be, merely called as tetracyclododecene) 8-methyl-tetracyclo[4.4.1$^{2,5}$.1$^{7,10}$.0]-dodeca-3-ene, 8-ethyl-tetracyclo[4.4.1$^{2,5}$.1$^{7,10}$.0]-dodeca-3-ene, 8-methylidene-tetracyclo[4.4.1$^{2,5}$.1$^{7,10}$.0]-dodeca-3-ene, 8-ethylidene-tetracyclo[4.4.1$^{2,5}$.1$^{7,10}$.0]-dodeca-3-ene, 8-vinyl-tetracyclo[4.4.1$^{2,5}$.1$^{7,10}$.0]-dodeca-3-ene, 8-propanyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, 8-methyl-8-methoxycarbonyl-tetracyclo[4.4.1$^{2,5}$.1$^{7,10}$.0]-dodeca-3-ene, 8-hydroxymethyl-tetracyclo[4.4.1$^{2,5}$.1$^{7,10}$.0]-dodeca-3-ene, and 8-carboxy-tetracyclo[4.4.1$^{2,5}$.1$^{7,10}$.0]-dodeca-3-ene, 5,6-diphenyl-bicyclo[2.2.1]hept-2-ene, 1,4-methano-1,4, 4a,9a-tetrahydrofluorene, 1,4-methano-1,4,4a,5,10,10a-hexahydroanthracene, 5-(naphthyl)-bicyclo[2.2.1]hept-2-ene, and 5-(biphenyl)-bicyclo[2.2.1]hept-2-ene;

8-cyclopentyl-tetracyclo[4.4.1$^{2,5}$.1$^{7,10}$.0]dodeca-3-ene, 8-cyclohexy-tetracyclo[4.4.1$^{2,5}$.1$^{7,10}$.0]-dodeca-3-ene, 8-cyczohexenyl-tetracyclo[4.4.1$^{2,5}$.1$^{7,10}$.0]-dodeca-3-ene and 8-phenyl-.cyclopentyl-tetracyclo[4.4.1$^{2,5}$.1$^{7,10}$.0]-dodeca-3-ene;

tetracyclo[7.4.1$^{10,13}$.0$^1$.0$^{1,9}$.0$^{2,7}$]trideca-2,4,6,11-tetraene (which may be called as 1,4-methano-1,4,4a,9a-tetrahydrofluorene), tetracyclo[8.4.1$^{11,14}$.0$^{1,10}$.0$^{3,8}$]-tetradeca-3,5,7,12-tetraene (which may be called as 1,4-methano-1,4,4a,5,10,10a-hexahydroanthracene), pentacyclo-[6.5.1$^{1,8}$.1$^{3,6}$.0$^{2,7}$,0$^{9,13}$]1 pentadeca-3,10-diene and pentacyclo-[7.4.1$^{3,6}$.1$^{10,13}$,0$^{1,9}$.0$^{2,7}$]pentadeca-4,11-diene; and tetramers of cyclopentadiene.

These norbornene monomers may have a substituent such as an alkyl group having 1 to 20 carbon atoms, a phenyl group, a carbonyl group, a hydroxyl group, an oxy group or halogen. The norbornene monomers may be used either alone or as a combination of at least two thereof.

The norbornene polymers optionally comprises repeating units derived from vinyl monomers or other monomers, in addition to the repeating units of a norbornene monomer. As examples of the copolymerizable vinyl monomers, there can be mentioned α-olefins having 2 to 20 carbon atoms such as ethylene, propylene, 1-butene, 1-pentene, 1-hexene, 3-methyl-1-butane, 3-methyl-1-pentene, 3-ethyl-1-pentane, 4-methyl-1-pentane, 4-methyl-1-hexene, 4,4-dimethyl-1-hexene, 4,4-dimethyl-1-pentane, 4-ethyl-1-hexane, 3-ethyl-1-hexene, 1-octene, 1-decene, 1-dodecene, 1-tetradecene, 1-hexadecene, 1-octadecene and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; and non-conjugated dienes such as 1,4-hexadiene, 4-methyl-1,4-hexadiene, 5-methyl-1,4-hexadiene and 1,7-octadiene. These vinyl monomers may be used either alone or as a combination of at least two thereof.

The procedure for polymerizing a norbornene monomer along for with a copolymerizable vinyl monomers, and the procedure for hydrogenating the norbornane polymer are not particularly limited and conventional procedures may be employed.

A ring-opening polymerization catalyst can be used for a ring-opening homopolymerization or copolymerization of a norbornene monomer. As specific examples of the ring-opening polymerization catalyst, there can be mentioned catalyst systems comprising a combination of a halogenated compound, a nitrate salt or an acetyl-acetone compound of a metal such as ruthenium, palladium, osmium, iridium or platinum, with a reducing agent; and catalyst systems comprising a combination of a halogenated compound or an acetyl-acetone compound of a metal such as titanium, vanadium, zirconium, tungsten or molybdenum, with an organic aluminum compound. The ring-opening homopolymerization and copolymerization are usually carried out in, the presence or absence of a solvent at a polymerization temperature of −50° C. to 100° C. under a polymerization pressure of 0 kg/cm$^2$ to 50 kg/cm$^2$.

A hydrogenation product of the norbornene polymer can be produced by a conventional procedure wherein a homopolymer or copolymer prepared by the ring-opening polymerization procedure is hydrogenated with hydrogen in the presence of a hydrogenation catalyst. The degree of hydrogenation is usually at least 50%, preferably at least 70% and more preferably at least 70%.

An additional copolymer of a norbornene monomer with a copolymerizable vinyl monomer can be produced, for example, in a polymerization medium of a solvent or without use of a solvent in the presence of a catalyst system comprising a combination of a titanium, zirconium vanadium compound with an organic aluminum compound. The polymerization temperature and pressure are usually in the range of −60° C. to 100° C. and the range of 0 kg/cm$^2$ to 50 kg/cm$^2$, respectively.

(2) Monocyclic olefin polymer

Monocyclic olefin polymers are produced by addition polymerization of a monocyclic olefin monomer such as cyclohexene, cycloheptene or cyclooctene. As specific examples of the cycooefin monomer and the polymerization procedures, there can be mentioned those which are recited in Japanese Unexamined Patent Publication NO. S64-6216, (3) Cyclic conjugated diene polymer Cyclic conjugated diene polymers are produced by 1,2- or 1,4-addition polymerization of a cyclic conjugated diene, monomer such as cyclopentadiene or cyclohexadiene, and if desired, the cyclic conjugated diene polymers are hydrogenated. Examples of the cyclic conjugated diene monomer and the polymerization procedure are recited is Japanese Unexamined Patent Publication No. H6-136057 and ibid. H7-258318.

(4) Vinyl alicyclic hydrocarbon polymer

Vinyl alicyclic hydrocarbon polymers are produced by polymerization of a vinyl alicyclic hydrocarbon polymer such as vinylcyclohexane or polymerisation of a vinyl unsaturated alicyclic hydrocarbon polymer such as vinylcyclohexene followed by hydrogenation, for addition polymerization of a vinyl aromatic monomer such an styrene or a-methylstyrene, followed by hydrogenation. Examples of the monomer and the polymerisation procedure are recited in Japanese Unexamined Patent Publication No. S51-59989, ibid. 863-43910 and ibid. S64-1706.

The thermoplastic cyclic olefin resins used in the invention, which have repeating units having an alicyclic structure other than a norbornane structure; are produced by polymerizing alone a, norbornene monomer selected from those which are recited above for the production of the nornornene polymer, such as 5,6-diphenyl-bicyclo[2.2.1)] hept-2-ene, 1,4-methano-1,4,4a,9d-tetrahydrofluorene, 1,4-methano-1,4,4a,5,10,10a-hexahydroanthracene, 5-(α-naphthyl)-bicyclo[2.2.1]hept-2-ene and 5-(biphenyl)-bicyclo[2,2,1]hept-2-ene, or a combination of at leant two of these monomers, or a combination of at least one of these monomers with other norbornene monomer, a monocyclic olefin monomer, a cyclic conjugates diene monomer, a vinyl alicyclic hydrocarbon monomer, a vinyl aromatic monomer or a other vinyl monomer. The polymerization includes ring-opening polymerization and addition polymerization. If desired, the thus-obtained cyclic olefin polymer is hydrogenated.

The molecular alight of the thermoplastic cycloolefin resin is appropriately chosen depending upon the particular use thereof. The molecular weight thereof expressed as number average molecular weight is usually at least 9,000, preferably in the range of 5,000 to 500,000, more preferably 8,000 to 200,000 and especially preferably 10,000 to 100,000, in view of highly balanced moldability and mechanical strength. The number average molecular weight is measured by gel permeation chromatography of a solution in cyclohexane (if the polymer is insoluble therein, a solution in toluene used) using a calibration curve drawn on a standard polystyrene.

The melt flow rate of the thermoplastic cycloolefin resin can also be appropriately chosen depending upon the particular use thereof, but, it is usually the melt flow rate is in the range of 1 g/10 min to 100 g/10 min, preferably 2 g/10 min to 50 g/10 min and more preferably 3 g/10 min to 40 g/10 min, as measured according to JIS-K-6719 at a temperature of 280° C. and a load of 2.16 kgf. If the melt flow rats is too low, a high temperature is employed for molding and sometimes processing and handling become difficult. In contrast, if the melt flow rate is toe high, molding defects such as uneven thickness of the molded article occur.

The thermoplastic cycloolefin resin may be used either alone or as a combination of at least two thereof (2) Other Ingredients According to the need, other ingredients maybe contained in the layer (I) comprising the thermoplastic cycloolefin resin.

As examples of the ingredients to be incorporated with the thermoplastic cycloolefin rein, there as be mentioned an antioxidant, a stabilizer, an ultraviolet absorber, a flame retardant, a plasticizer, a nucleating agent, a hydrochloric acid absorber, a pigment, a dye, an antistatic agent, a filler, a lubricant, a partial ester or partial ether of a polyhydric alcohol, an anti-blocking agent, a soft polymer, other thermoplastic resins, and an organic oligomer ingredient. These ingredients are preferably insoluble or slightly soluble in a chemical liquid, and usually selected from those which have a molecular weight of, for example 500, preferably at least 1,000. A colorant can be incorporated in the thermoplastic, cycloolefin resin-containing layer (I) to impart sun screening effect to the resin layer (I), The soft polymer to be optionally incorporated usually have a glass transition temperature (Tg) of not higher than 30° C. When the thermoplastic cycloolefin polymer has a plurality of glass transition temperatures (Tg) or both of Tg and a melting point (Tm), by the term "glass transition temperature" used herein we mean the lowest Tg.

The soft polymer includes, for example, (a) a soft olefin polymer made from an α-olefin monomer such as ethylene and, propylene or a monomer mixture predominantly comprised of an α-olefin monomer, (b) a soft isobutylene polymer made from isobutylene or a monomer mixture predominantly comprised of isobutylene, (c) a soft diene polymer made from a conjugated diene such as butadiene or isobutylene or a monomer mixture predominantly comprised of a conjugated diene, a soft polymer having a silicon-oxygen band in the backbone such as an organopolysiloxane (e) a soft polymer made from an α, β-unsaturated acid or its derivative or a monomer mixture predominantly comprised thereof, (f) a, soft polymer made from an alcohol end an amine or its acyl derivative or an acetal, or a monomer mixture thereof, (g) a polymer of an epoxy compound, (h) a flourorubber, end (i) other soft rubbers, As specific examples of the soft rubber, there can be mentioned (a) soft olefin polymers, such as liquid polyethylene, atactic polypropylene, homopolymers of 1-butene, 4-methyl-1-butane, 1-hexene, 1-Octene and 1-decene, an ethylene-α-olefin copolymer, a propylene-α-olefin copolymer, an ethylene-propylene-diene copolymer (EPDM), an ethylene-cycloolefin copolymer and an ethylene-propylene-styrene copolymer; (b) soft isobutylene polymer, such as polyisobutylene, isobutylene isoprene rubber and an isobutylene-styrene copolymer; (c) soft diene polymers, such as conjugated diene homopolymers such as polybutadiene and polyisoprene, conjugated diene random copolymers such as a butadiene-styrene random copolymer as isoprene -styrene random copolymer, an acrylonitrile-butadiene copolymer and a hydrogenation product thereof, and an acrylonitrile-butadiene-styrene copolymer; and block copolymers of a conjugated diene with an aromatic vinyl hydrocarbon such as a butadiene-styrene block copolymer, a styrene-butadiene-styrene block copolymer, an isoprene-styrene block copolymer and a styrene-isoprene-styrene block copolymer, and a hydrogenation product thereof; (d) silicon-oxygen bond-having soft polymers, such as dimethylpolysiloxane, diphenylpolysiloxane and dihydroxypolysiloxane; (e) soft polymers of an α, β-unsaturated acid or its derivative, such as homopolymers of acrylic monomers such as polybutyl acrylate, polybutyl methacrylate, polyhydroxyethyl methacrylate, polyacrylamide and polyacrylonitrile, and copolymers of acrylic monomers with other monomers, such as a butyl acrylate-styrene copolymer; (f) soft polymers of an alcohol and an amine or its acyl derivative or an acetal, such as homopolymers of unsaturated esters or unsaturated alcohols such as polyvinyl alcohol, an ethylene-vinyl alcohol copolymer, polyvinyl acetate, polyvinyl stearate, polyvinyl benzoate and polyvinyl maleate, and copolymers of unsaturated esters or unsaturated alcohols such as an vinyl acetate-styrene copolymer; (g) epoxy group-containing soft polymers such as polyethylene oxide, polypropylene oxide, and epichlorohydrin rubber; (h) fluororubbers such as a vinylidene fluoride rubber and a poly-tetrafluoroethylene-propylene rubber; and (i) other soft rubbers such as natural rubber, polypeptide, protein, and thermoplastic polyester elastomers described in Japanese Unexamined Patent Publication No. H8-737090 a thermoplastic vinyl chloride elastomer and a thermoplastic polyamide elastomer, These soft polymers may have a cross-licked structure, or a functional group introduced by modification.

Among the above-recited soft polymers, the soft polymers of (a), (b), (c) and (d) are preferable in view of excellent rubber elasticity, mechanical strength, softness and dispersibility soft diene polymers (C) are especially preferable, and a hydrogenation product prepared by hydrogenating the carbon-carbon unsaturated bonds of a soft diene polymer is most preferable. As specific examples of the hydrogenation product of a soft diene polymer, there can be mentioned a hydrogenation product of a homopolymer such as polybutadiene, a hydrogenation product of a random copolymer such as a butadiene styrene copolymer, and a hydrogenation product of a block copolymer such as a butadiene-styrene block copolymer, a styrene-butadiene-styrene block copolymer, an isoprene-styrene block copolymer or a styrene-isoprene-styrene block copolymer.

As specific examples of the other thermoplastic resins optionally used, there can be mentioned amorphous resins such as polyvinyl chloride, polymethyl methacrylate, polystyrene, a methyl methacrylate-styrene copolymer, polyacrylonitrile, an acrylonitrile-styrene copolymer, high-impact polystyrene (HIPS), an acrylonitrile-butadiene-styrene copolymer (ABS resin), polycarbonate, polyallylate, polysulfone, polyether-sulfone and polyphenylene-ether; chain polyolefins such as polyethylene, polypropylene and polymethylpentene; polyesters such as polyethylene terephthalate, polybutylene terephthalate, polyethylene naphthalate and aromatic polyesters; polyamides such as nylon-6, nylon-66, nylon12 and polyamide-imide; vinyl or vinylidene polymers such as polyvinyl alcohol sad polyvinylidene chloride; fluoropolymers such as polyvinylidene fluoride and polytetrafluoroethylene; and crystalline resins (i.e., those in which a crystalline melting point is observed at the thermal characteristic measurement) such as polyacrylonitrile, syndiotactic polystyrene, polyoxymethylene, polyphenylene sulfide, polyether-etherketone and a liquid crystal polymer.

Of these, crystalline polymers are preferable in view of mechanical strength and solvent resistance. Among the crystalline polymers, chain polyolefins such as polyethylene including high-density polyethylene, low-density polyethylene, ultra-low-density polyethylene and ultra-high-molecular-weight polyethylene, and polypropylene are especially preferable in view of specula gravity and mechanical strength.

The soft polymers may be used either alone or as a combination of at least two thereof.

The amount of the soft polymer and the other resin, optionally incorporated in the thermoplastic cycloolefin resin-containing layer (I), is usually in the range of 0.001% to 50% by weight, preferably 0.1% to 40% by weight and more preferably 1%, to 30% by weight based on the total weight of the thermoplastic cycloolefin resin and the soft polymer and the other resin. When the amount of the soft polymer and the other polymer is in this range, a container or blow molded article has a more enhanced mechanical strength.

The procedure by which the above-recited ingredients are incorporated is not particularly limited, provided that the ingredients are dispersed in the resin composition to an extent such that the light transmittance of the resin is not lowered. For example, an ingredient is incorporated in a molten resin and the mixture is kneaded by a mixer, a single screw extruder or a twin-screw extruder, or the resin is dissolved in a solvent and an ingredient is dispersed in the solution, followed by the removal of the solvent by means of coagulation, casting or direct drying.

The kneading of the resin is usually carried out by applying a sufficient shearing force to the resin while the resin is maintained at a temperature in the range of $(Tg+20)°$ C. to $(Tg+150)°$ C. (wherein Tg is a glass transition temperature of the thermoplastic cycloolefin resin). If the resin temperature is too low, the viscosity is undesirably high and the kneading become difficult. In contrast, if the resin temperature is too high, the resin and the ingredient are liable to be deteriorated, and the kneading cannot be effectively carried out by the difference in viscosity and melting point. When a twin-screw extruder is used, the kneaded resin mixture is usually extruded in a molten state and then an extrudate is cut by a strand cutter into pellets.

Laver (II) Comprising Resin Other Than Thermoplastic Cycloolefin Resin (1) The thermoplastic, resin other than the thermoplastic cycloolefin resin includes the above-recited amorphous resins and crystalline resins, which are optionally incorporated with the thermoplastic cycloolefin resin. When the crystalline. resins are used, the mechanical strength and solvent resistance of a container are more enhanced. Especially when chain polyolefins such as polyethylene (for example, low-density polyethylene, high-density polyethylene, straight-chain low density polyethylene and ultra low-density polyethylene) and polypropylene are used, containers having a light weight and a high strength can be obtained at a low cost.

These resins may be used either alone or an a combination of at least two thereof. The layer (II) may comprise at least two resins other than the thermoplastic cycloolefin resin, and at least two layers (II) comprising different resins which are other than the thermoplastic cycloolefin resin may be used.

(2) Other Ingredient

In the resin other than the thermoplastic cycloolefin resin, various ingredients can be incorporated according to the need. The ingredients can be selected from those which are recited above as the ingredients to be incorporated in the thermoplastic cyclolefin resin but which exclude the resin other than the thermoplastic cycloolefin resin.

The procedure by which the ingredients are incorporated can be the same as that employed for incorporating ingredients in the thermoplastic cycloolefin resin.

Structure of Laminate

The laminate constituting a container of the invention comprises at least two layers, which include at least one layer (I) comprising the thermoplastic cycloolefin resin and at least one layer (II) comprising the resin other than the thermoplastic cycloolefin resin. The order in which the respective layers are superposed is not particularly limited, but, when the innermost layer of a container is the thermoplastic cycloolefin resin-containing layer (I), the container exhibits excellent insolubility. When the laminate comprises at least three resin layers, the same kind of two resin layers may be provided so that the two layers are not brought into contact with each other, and the entire resin layers may be different resin layers. More specifically, a three-layered laminate having a resin layer (II) sandwiched between two thermoplastic cycloolefin resin layers (I) can be employed, which layers (I) may comprise either the same or different kinds of thermoplastic cycloolefin resins. A two-layered laminate having a thermoplastic cycloolefin resin layer (I), and a resin layer (II) adhered on one side of the layer (T) which is toward the outer side of container.

The thermoplastic cycloolefin resin layer (I) usually has a thickness in the range of 0.001 mm to 99.5 mm, preferably 0.01 mm to 50 mm and more preferably 0.1 mm to 10 mm. The resin layer (II) usually has a thickness in the range of 0.5 mm to 99.9 mm, preferably 0.5 mm to 70 mm and more preferably 1 mm to 20 mm. When the thickness of the layer (I) is in the above range, occurrence of cracks at molding can be prevented. For producing a container having a large size, the layer (I) should preferably be as thin as possible, but toe low thickness leads to reduction of insolubility. When the thickness of the layer (II) is in the above range, high mechanical strength can be obtained.

The laminate preferably has an innermost layer comprised of layer (I) and an outermost layer comprised of layer (II). By this constitution of the laminate, a container or blow molded article exhibits highly balanced moldability sad reduced solubility.

The layer (II) is preferably thicker than the layer (I) in view of the high mechanical strength of the container or molded article.

An adhesive layer can be provided between the layer (I) and the layer (II). As the adhesive, the conventional adhesives can be used, which include, for example, maleic anhydride-modified polyolefin resins such as Admer supplied by. Mitsui Chemicals Inc. and Modic supplied Mitsubishi Chemical Corp, Amorphous or lowly crystalline soft polymers such as unsaturated polyolefins, and an ethylene-acrylic acid ester-maleic anhydride terpolymer such as Bondine supplied by Sumika CDF Chem., and compositions containing these adhesives.

The thickness of the laminate is not particularly limited but is preferably in the range of 0.001 mm to 100 mm, more preferably 0.01 mm to 50 mm, and especially preferably 0.05 to 10 mm. When the thickness of the laminate is in this range, a container having wall-balanced light weight, reduced solubility and mechanical strength is obtained.

Vessel

The method for molding is not particularly limited provided that the container has the above-mentioned laminate structure. For example, the following molding methods can be employed.

In a first molding method, the layer (I) comprising the thermoplastic cycloolefin resin and the layer (II) comprising the other resin are separately shaped into a sheet, pipe or tube form by extrusion or injection molding they are laminated together, and the laminate is blow molded into a container of a desired shape. If desired, the laminate can be drawn prior to the blow molding.

In a second molding method, a molten layer (I) comprising the thermoplastic cycloolefin resin end a molten layer (II) comprising the other resin are simultaneously prepared and directly joined together to form a container by multi-layer blow molding or injection molding. The multi-layer blow molding is advantageous because a container having a large sine and a thin wall can easily be produced.

In the blow molding, usually a blew ratio of 1.3 to 50, preferably 2 to 30 and more preferably 3 to 10 is employed. By the term "blow ratio" used herein we mean the wall thickness of a parison divided by the wall thickness of a container after molding. For example, when the wall thickness of a parison is 5 mm and the average wall thickness is 1 mm, the blow ratio is 5. In the blow molding, a parison is drawn in the vertical direction and/or the horizontal direction. The drawing direction is not particularly limited, but the draw ratios in the vertical direction and the horizontal direction are preferably approximately the same. The blow ratio in the respective directions can be determined by the ratio of the length of a blown container and the length at a parison. Thus, when a laminate having at least the layer (I) comprising the thermoplastic cycloolefin resin and the layer (II) comprising the other resin are blow-molded into a container at a blow ratio of 1.3 to 50, the wall thickness and draw ratio are appropriate, and the container has well-balanced light weight and mechanical strength.

The bottom of the container is preferably planar, but the bottom may curve or bulge toward the inside of the container to some extent.

The container of the invention can be constituted by a single laminate. When a container of a large size is made, an outer reinforcing layer made of metal or other material can be provided. The capacity of the container is not particularly limited, but, for example, it is preferably 50 ml to 300 liters for a container made of a single laminate. When the capacity exceeds 30 litters, an outer reinforcing layer is preferably provided.

In the container of the invention the ratio of the capacity in ml to the thickness in mm of the side wall is usually in the range of 100 to 20,000, preferably 120 to 10,000 and more preferably 150 to 5,000. When the ratio of the capacity to the aide wall thickness is in this range, the container has highly balanced light weight and mechanical strength.

The container of the invention is used as, for example, containers or containers for industrial chemicals such as chemicals, pesticides gasoline and oils; medicines; food; and toiletries such as detergents and cosmetics. Especially it is useful for containers or containers for storage and transportation of industrial chemicals, to which a high purity is required.

The shape of the container is not particularly limited and includes for example, vial-shape, drum-shape, tank-shape, container-shags and chemical storage tank-shape The laminate having (I) a layer comprising a thermoplastic cycloolefin resin comprising at least 30% by weight of repeating units (A) with an alicyclic structure, at least 30% by weight of which is repeating unite (A-i) with an alicyclic structure other than a norbornane structure, and (II) a layer of the other resin, can be made into a container having the above-mentioned characteristics, and also be made into a blow molded article used in a field other than a container or container The blow molded article includes, for example, shaped articles by a blow molding procedure such as injection blow molding, direct blow molding and sheet blow molding. Specific examples of the blow molded article, there can be mentioned pipes, hoses and tubes as wall as containers and containers. An especially preferable example, of the molded article is an inlet pipe or outlet pipe for chemicals used for the production of a semiconductor.

EMBODIMENTS FOR CARRYING OUT THE INVENTION

Now preferred embodiments for carrying out the invention will be described with reference to the accompanying drawings First embodiment of practice As illustrated in FIG. 1, a container 2 of the invention constitute a container by itself which comprises a cylindrical body part 4. A neck portion 6 is integrally molded with top opening part defining an opening 8 of the body 4, and a bottom part 10 is integrally molded with the body part 4. The bottom part 10 is planar, and the vertical axis of the body part 4 is substantially perpendicular to the plane of the bottom part 10. The bottom part 10 and the body part 4 are integral with each other through an intersecting part 12 with a curvature R.

As seen from the enlarged view (B) in FIG. 1, the curvature R at the intersecting part 12 means a curvature 4$f$ the curved area extending to the cuter lace of the body part 4 and the outer face of the bottom part 10. Thickness t (mm) is a thickness shown in the cross-section of the intersecting part 12. Thickness means the dimension of smallest measurement between the inner surface and the outer surface of a container or vessel. That is, thickness means the length of a segment of line which perpendicular to the inner and outer surfaces, or perpendicular to a tangent line on a curve of convex surface. As the R increases, cracking or breaking of the container is suppressed and strength of the container increases. Therefore, there is no upper limit in the curvature, but, in view of the shape of container the curvature is usually not larger than 50 cm, preferably not larger than 20 cm and more preferably not larger than 15 cm.

The thickness of the body part 4, that of the bottom part and that of the intersecting part 12 are usually at least 0.5 mm, preferably in, the range of 0.7 mm to 100 mm and mare preferably 1.0 mm to 50 mm. The thickness $t_1$ (mm) of the bottom part 10 shown in an enlarged view (c) in FIG. 1 is preferably approximately the same as or larger than the thickness $t_2$ (mm) of the body part 4. However, the larger the difference in thickness between the body part 4 and the bottom part 12, the larger the stress concentration occurring upon falling down. Therefore thickness $t_1$ (mm) end thickness $t_2$ (mm) should preferably satisfy the relationship: $0.9 \leq t_1/t_2 \leq 3$, more preferably $1.0 \leq t_1/t_2 \leq 2.5$, and most preferably $1.2 \leq t_1/t_2 \leq 2.2$. By the term "thickness $t_1$ of the bottom part 10" used herein we mean the thickness of the thinnest portion of the bottom part 12. When high oxygen gas and carbon dioxide gas barrier properties are required, this requirement is satisfied by an increased thickness, and oxidative deterioration and change of liquid characteristics can be minimized. However, an increase of the thickness leads to increase of cost and weight. If the thickness is too thin, the gas barrier properties and strength are poor. The thickness of the bottom part and that of the body part are preferably uniform in view of the impact strength, but, any limitation is not placed thereon.

The thickness t (mm) of the intersecting part 12 usually in the range of 0.5 mm to 100 mm, preferably 1 to 50 mm.

The capacity of the container in accordance with this embodiment is usually in the range of 50 ml to 300 liters, preferably 100 ml to 300 liters and more preferably 500 ml to 300 liters.

In the above-mentioned embodiment, the bottom part is planar, but, in view of shrinkage occurring at blow molding or the application of container, the face of the bottom part 10 can be gently curved or bulged toward the inside of the container.

As illustrated in enlarged view (H) in FIG. 1, the container 2 of this embodiment is made of a laminate comprising a layer 2a comprising a thermoplastic cycloolefin resin and a layer 2b comprising the other resin. The layer 2b is composed of polyolefin which is a crystalline resin.

The thickness of the layer 2a comprising a thermoplastic cycloolefin resin is in the range of 0.001 mm to 100 mm. The thickness of the layer 2b comprising other resin (a) is in the range of 0.5 mm to 100 mm. Usually the thickness of the layer 2b is larger than that of the layer 2a. In this embodiment, the laminate has an innermost thermoplastic cyclolefin resin layer and an outermost other resin layer.

The container illustrated in FIG. 1 can be shapes by blow molding a laminate having the layer 2a comprising a thermoplastic cycloolefin resin and the layer 2b comprising other resin by a blow molding apparatus for example, shown in FIG. 2.

The blow molding apparatus 14 illustrated in FIG. 2 is a mold used for a multi-layer extrusion blow molding procedure. FIG. 2 illustrates the state immediately before the blow molding wherein a first mold 16 and a second mold 18 are opened and a parison 20 is inserted therein. The parison 20 is composed of a laminate having the layer 2a comprising a thermoplastic cycloolefin resin and the layer 2b comprising other resin, which laminate is made by coextruding a melt of the layer 2a and a melt of the layer 2b. A top part of the parison to be formed into the top opened neck part of the container is molded by a neck meld 24. The first mold 16 and the second mold 18 are closed so that, the parison 20 is sandwiched between the two molds. Air is blown through a sore 22 into the parison 20. The parison 20 is expanded by the air pressure and pressed against the molding faces 16a and 18a of the molds 16 and 18, respectively, whereby shaped into a desired shape. After cooled, the core is withdrawn and the shaped article is taken out.

The conditions employed ass not particularly limited, but the mailing temperature varies depending upon the particular kinds of the thermoplastic cycloolefin resin and the other resin.

In FIG. 2, a blow molding by using a multi-layer extrusion blowing procedure. Other blow molding procedures such as inaction blow molding and sheet blow molding van be employed. The blow molded container of the invention can be made by any blow molding procedure wherein a parison is expanded by blown air.

The blow ratio employed in the invention is preferably in the range of 1.3 to 50, more preferably 2.0 to 30 and especially preferably 3.0 to 10. When a container is blow molded from a laminate having the thermoplastic cycloolefin resin layer 2a and the other resin layer 2b at this blow ratio, the thickness and the drawing ratio can be optimized and a container having highly balanced light weight and strength and exhibiting excellent insolubility can be obtained.

The container of the invention is made of a laminate having a layer 2a comprising a thermoplastic cycloolefin resin and a layer 2b of other resin, and therefore, exhibits excellent insolubility and, when a container having a capacity of at least 50 ml is made, a high strength or toughness van be obtained even if the wall thickness is rendered thin. When the thickness of the layer 2a comprising a thermoplastic cycloolefin is within the above-specified range, occurrence of cracks at molding can be prevented. When the layer 2a comprising a thermoplastic cycloolefin resin is arranged in the innermost side of than laminate, dissolution of impurities can be prevented or minimized. When the thickness of the layer 2b of the other resin is within the above-specified range, a container having a high strength can be obtained. Further when the thickness of the lays 2b of the other rests, especially a chain polyolefin which is crystalline, is thinker than that of the layer 2e of a thermoplastic cycloolefin resin, the reduction of strength of the resulting container can be prevented. Especially when the layer 2a of a thermoplastic cycloolefin resin is arranged in the innermost side and the layer 2b of other resin is arranged in the outermost side, highly balanced insolubility and strength can be obtained.

Second embodiment of practice

As illustrated in FIG. 3, a container 32 accordance with this embodiment is composed of an inner container 33 and a reinforcing layer 35 closely adhered to the peripheral of the inner container 33. The reinforcing layer 35 has a function of reinforcing the container 32 and preventing light transmission The inner container 33 has a cylindrical body part 34, and a neck portion 36 is integrally molded with top opening part 38 defining en opening of the body 34, which structure is similar to that illustrated in FIG. 1. A bottom part 40 is integrally molded with the body part 34. The material of the reinforcing layer 35 is not particularly limited and may be made of, for example, metals such as steel, aluminum; stainless steel or a synthetic resin having incorporated therein a colorant. The other construction is similar to that of FIG. 1.

The container 32 of the second embodiment is made by forming the reinforcing layer 35 in the form of a container and then forming the inner container 33 by blow molding. The capacity of this container can be large, for example, 300 liters.

The inner container 33 of the container 32 of the second embodiment is made from a laminate having the layer 2a comprising a thermoplastic cycloolefin resin and the layer 2b of other resin in the same manner as in the first embodiment. Therefore, the container 32 exhibits excellent insolubility, and, when a container having a ultra-large capacity of, for example, 300 liters is made, a high strength or toughness can be obtained even if the wall thickness is rendered thin.

The above embodiments of practice of the invention are described for giving a batter understanding of the container of molded article of the invention, that by no means limit the scope of the invention. Various design alteration and modifications can be made within the scope of the invention.

The invention will now be specifically described by the following working examples that also by no means limit the scope of the invention. In the following working examples, parts and % are by weight unless otherwise specified.

The physical properties of polymers and containers were determined by the following methods.

(1) Molecular Weight

The molecular weight was measured by gel permeation chromatography using toluene an solvent and the number average molecular weight (Mn) was determined from a calibration curve drawn on a standard polystyrene.

(2) Molecular Weight Distribution

The weight average molecular weight (Mw) and the number average molecular weight (Mn) sere measured by gel permeation chromatography using toluene as solvent and determined from a calibration curve drawn on a standard polystyrene. The molecular weight distribution was expressed in terms of the ratio (Mw/Mn) of the weight average molecular weight (Mw) to the number average molecular weight (Mn).

(3) Hydrogenation Percentage

Percentages of hydrogenation on the backbone and the aromatic ring were determined by $^1$H-NMR.

(4) Glass Transition Temperature

The glass transition temperature was determined according. to JIS-K7121 wherein the measurement was parried out by differential spanning calorimeter (DSC).

(5) Specific Gravity

The specific gravity was determined according to JIS-K7112 Method A.

(6) Melt Flow Rate

The melt flow rate was measured according to JIS-K6719 at a temperature of 280° C. under a load of 2.16 kgf.

(7) Solubility

A container was charged with 800 g of ultra-pure water end closed with a cap. The container was left to stand in an atmosphere at 23° C. and 50% RH for 350 hours. Then the content was recovered and low-molecular-weight organic ingredients were determined by a TOC analyzer end metal elements were determined by ICP (inductively coupled plasma atomic emission spectrochemical analysis).

(8) Mechanical Strength

A container was charged with 30% by volume, based on the capacity of the container, of caster (for example, 480 g of water was charged in a container having a capacity of 1,600 ml) and closed with a cap. The container wee inclined by 45 degree from the vertical axis and fallen on a concrete floor from a height of 120 cm. Ten container specimens were tested, and the mechanical strength was evaluated by the number of broken containers.

Production Example 1

Production of thermoplastic cycloolefin resin.

In a nitrogen atmosphere, 50 parts of tetracyclo [$4.4.1^{2,}$ $8,1^{7,10}$,0]-dodeca-3-ene (hereinafter abbreviated to "TCD") and 50 parts of tricyclo[$4.3.1^{2,5},0^{1,6}$]-deca-3,7-diene (trivial name: dicyclopentadiene; hereinafter abbreviated to "DCPD") were copolymerized by using a knows metathesis ring-opening polymerization catalyst, and the copolymer was hydrogenated by a known procedure to give a hydrogenated TCD/DCPD ring-opened copolymer. The hydrogenated ring-opened copolymer had a number average molecular weight (Mn) of 28,004, a hydrogenation percentage of at least 99.8%, Tg of 135° C., and a melt flow rate of 3 g/10 min. To 100 parts of a pellet of the hydrogenated ring-opened copolymer, 0.05 part of pentaerythrityl-tetrakis[3(3, 5-di-tert.-butyl-4-hydroxyphenyl)prapionate] was incorporated and the mixture was kneaded by e twin-screw extruder to give a pellet-form molding material. The pellet was heat-pressed at a resin temperature of 200° C. under a load of 300 kgf/cm$^2$ for 3 minutes into a plate having a size of 20 mm×15 mm×3.0 mm (thickness). The plate was transparent and exhibited a minimum light transmittance of 90.0% at a wavelength of 400 nm to 700 nm.

Production Example 2

Production of thermoplastic cycloolefin resin

The procedure described in Production Example 1 was repeated wherein 100 g of DCPD was used instead of 50 parts of TCD plus 50 parts of DCPD to obtain a hydrogenated DCPD ring-opened polymer. The hydrogenated DCPD ring-opens polymer had an (Mn) of 27,000, a hydrogenation percentage of at least 99.8%, a Tg of 98° C. and a melt flow rate of 4 g/10 min.

Examples 1 and 2

Each of the resin produced in Production Examples 1 and 2, and high-density polyethylene (B680 supplied by Asahi Kasei K. K.; hereinafter abbreviated to "HDPS") were separately extruded by two extruding multi-layer blow molding apparatuses to obtain a laminate having a thermoplastic cycloolefin resin-containing layer and a HDPE-containing layer. A hollow multi-layer container having a diameter of 10 cm and a height of 20 cm was made from the laminate by multi-layer blow molding at a blow ratio of 2.25. The container rind a continuous curved area extending from the outer side face of the cylindrical body to the bottom face of the container. The curved area had a curvature R of 2.5 mm and a thickness "t" of 1.7 mm. The container wall was composed of the thermoplastic cycloolefin resin-containing layer having a thickness of 0.7 mm and the HDPE-containing layer having a thickness of 1 min. The ratio of capacity of the container (ml)/thickness of side wall of the container (mm) was about 920.

(1) Determination of mechanical strength: falling test

Ten containers were tested for evaluation of mechanical strength. No breakage was found in all of the ten containers.

(2) Solubility

Each container was charged with ultra-pure water in a stated atmosphere, and after standing for a stated period of time, the contents of low-molecular-weight organic ingredients and metal elements in the water were measured. The content of low-molecular-weight organic ingredients was below 0.02 ppm, and the content of metal elements was below 0.02 ppm.

Comparative Example 1

The procedures described in Example 1 were repeated wherein only the acme HDPE an used in Example 1 was used instead of a combination of HDPE and the thermoplastic cycloolefin resin to obtain e hollow single layer container having a diameter of 10 cm and a height of 20 cm by multi-layer blow molding at a blow ratio of 2.25. The container had a continuous curved area extending from the cylindrical body to the bottom face; which area had a curvature of 2.5 mm and a thickness "t" of 1.7 mm.

(1) Determination of mechanical strength: falling test

Ten containers were tested for evaluation of mechanical strength. A multiplicity of cracks occurred in one of the containers. More specifically cracks were found in the vicinity of the intersecting area 12 between the body part 4 and the bottom part 10 shown in FIG. 1.

(2) Solubility

Each container was charged with ultra-pure water in a stated atmosphere, and, after standing for a stated period of time, the contents of low-molecular-weight organic ingredients and metal elements in the water were measured. The content of low-molecular-weight organic ingredients was 4 mg/liter, and the content of metal elements was 0.5 ppm.

Comparative Example 2

The procedures described in Example 1 were repeated wherein only the same thermoplastic cycloolefin resin as used in Example 1 was used instead of a combination of HDPE sad the thermoplastic cycloolefin resin to obtain a hollow single layer container having a diameter of 10 cm and a height of 20 cm by multi-layer blow molding at a blow ratio of 2.25. The container had a continuous curved area extending from the cylindrical body to the bottom face, which area had a curvature R of 2.5 (mm) and a thickness "t" of 1.7 mm.

(1) Determination of mechanical strength: falling test

Ten containers were tested for evaluation of mechanical strength. A multiplicity of cracks occurred in three of the containers. More specifically cracks were found in the vicinity of the intersecting area is between the body part 4 and the bottom, part 10 shown in FIG. 1.

(2) Solubility

Each container was charged with ultra-pure water in a stated atmosphere, and, after standing for a stated period of time, the contents of low-molecular-weight organic ingredients and metal elements in the water were measured. The content of low-molecular-weight organic ingredients was below 0.02 ppm, and the content of metal elements was below 0.02 ppm.

As seen from the above working examples, the hollow single layer container of comparative Example 1 was satisfactory in insolubility but had poor mechanical strength. The hollow single layer container of comparative Example 2 had poor mechanical strength. In contrast, the hollow multi-layer containers of Examples 1 to 3 had excellent insolubility and mechanical strength.

Example 3

The procedures described in Example 1 were repeated wherein the thermoplastic cycloolefin resin layer and the HDPE layer were separately extruded to form a laminate having the two layers. A hollow multi-layer container having a diameter of 24 cm and a height of 40 cm was obtained by blow molding. The container wall was composed of the thermoplastic cycloolefin resin-containing layer having a thickness of 0.3 mm, and the HDPE-containing layer having a thickness of 0.7 mm. The ratio of capacity of the container (ml)/thickness of side wall of the container (mm) was about 18,000. Determination mechanical strength of ten containers revealed that no breakage was found in all of the ten containers.

Comparative Example 3

The procedures described in Example 3 were repeated wherein only the same thermoplastic cycloolefin resin as used in Example 1 was used instead of a combination of HDPE and the thermoplastic cycloolefin resin to obtain a hollow single layer container having the same capacity and side wall thickness as those in Example 3 by blow molding. Ten containers were tested for evaluation of mechanical strength. A multiplicity of cracks occurred in six of the containers. More specifically cracks were found in the vicinity of the intersecting area 12 between the body part 4 and the bottom part 10 shown in FIG. 1.

INDUSTRIAL APPLICABILITY

The container of the invention is made of a laminate having a layer comprising a thermoplastic cycloolefin resin and a layer comprising a resin other than the thermoplastic cycloolefin resin. Therefore, the container exhibits excellent insolubility and, when a container having a large capacity of at least 50 ml is made, a high strength can be obtained even if the wall thickness is tendered thin. Therefore, containers are provided which are especially suitable for storage and transportation of chemicals used for the production of a semiconductor, for which it is required that the chemicals are not contaminated with impurities.

What is claimed is:

1. A container comprised of a laminate having (I) a layer comprising a thermoplastic cycloolefin resin and (II) a layer comprising a resin other than the thermoplastic cycloolefin resin, characterized in that said thermoplastic cycloolefin resin comprises at least 50 to 100% by weight of repeating units (A) having an alicyclic structure, at least 30% by weight of which is repeating units (A-i) having an alicyclic structure other than a norbornane structure; and said thermoplastic cycloolefin resin is a norbornene polymer or a hydrogenation product thereof, wherein said norbornene polymer contains 30% to 100% by weight, based on the total repeating structure units derived from at least one monomer selected from the group consisting of norbornene monomers having two rings and norbornene monomers having at least three rings and is prepared by a ring-opening polymerization of said at least one monomer; and said resin other than the thermoplastic cycloolefin resin is at least one resin selected from the group consisting of chain polyolefins.

2. The container according to claim 1, which is made by blow molding.

3. The container according to claim 2, wherein the blow molding is serried out at a blow ratio in the range of 1.3 to 50.

4. The container according to claim 1, which has a capacity in the range 50 ml to 300 liters.

5. The container according to claim 1, which is used for storage and transportation of a chemical liquid used for the production of a semiconductor.

6. The container according to claim 1, wherein the thermoplastic cycloolefin resin has a melt flow rate in the range of 1 g/10 min as measured according to JIS-K-6719 at a temperature of 280° C. and a load of 2.16 kg.

7. The container according to claim 1, wherein the laminate has a thickness in the range of 0.05 nm to 10 mm.

8. The container according to claim 1, wherein the ratio of the capacity in ml of the container to thickness in mm of the side wall of the container is in the range of 100 to 20,000.

9. A blow molded article comprised of a laminate having (I) a layer comprising a thermoplastic cycloolefin resin and (II) a layer comprising a resin other than the thermoplastic cycloolefin resin, characterized in that said thermoplastic cycloolefin resin comprises at least 50 to 100% by weight of repeating units (A) having an alicyclic structure, at least 30% by weight of which is repeating units (A-i) having an alicyclic structure other than a norbornane structure; and said thermoplastic cycloolefin resin is a norbornene polymer or a hydrogenation product thereof, wherein said norbornene polymer contains 30 to 100% by weight, based on the total repeating structure units, of repeating units derived from at least one monomer selected from the group consisting of norbornene monomers having two rings and norbornene monomers having at least three rings and is prepared by a ring-opening polymerization of said at least one monomer; and said resin other than the thermoplastic cycloolefin resin is at least one resin selected from the group consisting of chain polyolefins.

* * * * *